United States Patent
Hasse

(10) Patent No.: US 9,106,517 B1
(45) Date of Patent: Aug. 11, 2015

(54) INFORMATION TECHNOLOGY NETWORK

(71) Applicant: Phillip R. Hasse, Sierra Vista, AZ (US)

(72) Inventor: Phillip R. Hasse, Sierra Vista, AZ (US)

( * ) Notice: Subject to any disclaimer, the term of this patent is extended or adjusted under 35 U.S.C. 154(b) by 273 days.

(21) Appl. No.: 13/664,900

(22) Filed: Oct. 31, 2012

Related U.S. Application Data

(60) Provisional application No. 61/645,201, filed on May 10, 2012, provisional application No. 61/557,470, filed on Nov. 9, 2011.

(51) Int. Cl.
- *H04L 29/14* (2006.01)
- *H04L 12/24* (2006.01)
- *H04L 12/26* (2006.01)

(52) U.S. Cl.
CPC ............ *H04L 41/06* (2013.01); *H04L 41/0253* (2013.01); *H04L 41/5067* (2013.01); *H04L 43/0823* (2013.01)

(58) Field of Classification Search
CPC .............. H04L 29/08072; H04L 29/06; H04L 29/0809; H04L 29/06047; G06Q 30/02
USPC .............. 348/14.01; 370/242, 252, 255, 352; 380/258; 455/423; 703/27; 705/4, 7.34, 705/14.39, 14.43, 50; 707/602, 727, 736, 707/769; 709/201, 203, 206, 218, 219, 223, 709/224, 227, 230, 231, 239, 246; 713/164, 713/171; 714/5.11, 6.13, 26, 43; 715/753, 715/853; 717/101, 115, 121; 725/107; 726/11, 12, 22, 23

See application file for complete search history.

(56) References Cited

U.S. PATENT DOCUMENTS

| | | | |
|---|---|---|---|
| 6,651,189 B1 | 11/2003 | Jeon et al. | |
| 7,551,922 B2 | 6/2009 | Roskowski et al. | |
| 7,949,737 B2 * | 5/2011 | Tan | 709/223 |
| 8,045,476 B2 | 10/2011 | Mehta et al. | |
| 2007/0283401 A1 | 12/2007 | Lee et al. | |
| 2009/0207749 A1 | 8/2009 | Roskowski | |
| 2013/0103739 A1 * | 4/2013 | Salgueiro et al. | 709/203 |

OTHER PUBLICATIONS

Andrey et al., Performance of Network and Service Monitoring Frameworks, http://arxiv.org/PS_cache/arxiv/pdf/0907/0907.3047v1.pdf.
Andrey et al., Survey of SNMP Performance Analysis Studies, International Journal of Network Management, Int. J. Network Mgmt 2009; 19:527-548, published Jul. 30, 2009, http://eprints.eemcs.utwente.ni/16910/01/IJNM.pdf.

* cited by examiner

*Primary Examiner* — Aaron Strange
(74) *Attorney, Agent, or Firm* — Lodestar Patents, PLLC; Raymond J. E. Hall

(57) ABSTRACT

A computer network system relating to collecting (at a user-node) network and computer information (temporally adjacent to a user-perceived computing performance anomaly) from connectivity resource nodes at a time determined by user action. The system provides a local configurable resource for iteratively collecting computing performance information relating to the quality of service experienced by a computer user interfacing with a computer network.

21 Claims, 5 Drawing Sheets

INFORMATION TECHNOLOGY NETWORK

CROSS-REFERENCE TO RELATED APPLICATION

The present application is related to and claims priority from prior provisional application Ser. No. 61/645,201, filed May 10, 2012, entitled "IT SYSTEMS"; and, this application is related to and claims priority from prior provisional application Ser. No. 61/557,470, filed Nov. 9, 2011, entitled "INFORMATION TECHNOLOGY NETWORK SYSTEMS", the contents of all of which are incorporated herein by this reference and are not admitted to be prior art with respect to the present invention by the mention in this cross-reference section.

BACKGROUND

This invention relates to providing a system for improved information technology (IT) systems. More particularly, this invention relates to providing a system for improving the management of IT systems. Existing IT management paradigms utilize arbitrary performance benchmarks and thresholds to optimize computing performance without considering end-user perception of the computing performance quality. Conditions that cause instability and performance fluctuations, which could indicate that optimization is needed, are disparate and rapidly changing and offer limited opportunities for analyzing such conditions with any contextual relevance to the end-user. Thus, there is a need for a system that provides a local resource for collection of IT data, collected based upon end-user perception of computing performance quality.

OBJECTS AND FEATURES OF THE INVENTION

A primary object and feature of the present invention is to provide a system for overcoming the above-mentioned problem(s).

It is a further object and feature of the present invention to provide such a system, which provides temporal context to computing performance metrics based upon a user-perception of computing performance anomalies.

It is further an object and feature of the present invention to provide a system for collecting contextually relevant computing metrics from a local client computer system and from a computer network communicating with such local user computer system during a timeframe temporally adjacent to user-perception of anomalous computing performance.

It is still another object and feature of the present invention to provide a system for correlating such collected data with the timeframe temporally adjacent to user-perceived anomalous computing performance.

Another object and feature of the present invention is to provide a storage database for such collected information that is queryable and sortable to assist correlation of collected data with optimization needs.

Additionally, another object and feature of the present invention is to provide a configurable system that scales to the size of the network environment while maintaining functionality of permitting configuration of information to be collected.

Yet another object and feature of the present invention is to provide a system that permits collection of information specifically relevant to active network communication channels from a particular local client computer system.

An additional object and feature of the present invention is to provide a system that offers a non-invasive and simple to use tool, with minimal computing resource requirements, to effect collection of information contextually relevant to user perceived quality of network service.

An additional object and feature of the present invention is to provide a system that offers implementation without single points of failure.

A further primary object and feature of the present invention is to provide such a system that is efficient, inexpensive, flexible, and handy. Other objects and features of this invention will become apparent with reference to the following descriptions.

SUMMARY OF THE INVENTION

In accordance with a preferred embodiment hereof, this invention provides a computer network system, for collecting (at a client-node) network and computer information (temporally adjacent to a user-perceived computing performance anomaly) from connectivity resource nodes at a time determined by user action, comprising: client computer network-node means for networking with a plurality of network connectivity resource nodes; wherein such client computer network-node means comprises information collector computer processor means for collecting network and computer information temporally adjacent to at least one user-perceived computing performance anomaly, comprising time marker computer processor means for marking a time (t) of user action indicating a user-perceived computer performance anomaly, client-computer operations-state information collector computer processor means for collecting client-computer operations-state information temporally adjacent such time (t), network connectivity path map computer processor means for mapping network connectivity resource nodes along network connectivity paths actively in use by such client computer network-node means temporally adjacent such time (t), network connectivity node-state information requestor computer processor means for requesting network connectivity node-state information, from such network connectivity resource nodes along such network connectivity paths, temporally adjacent such time (t), information gatherer computer processor means for gathering such client-computer operations-state information, such network connectivity paths, and such network connectivity node-state information, and information computer storer means for storing such gathered such client-computer operations-state information, such network connectivity paths, and such network connectivity node-state information; and wherein such network and computer information comprises such client-computer operations-state information, such network connectivity paths, and such network connectivity node-state information; and wherein such user computer network-node means collects network and computer information temporally adjacent to the user-perceived computing performance anomaly indicated at such time (t).

Moreover, it provides such a computer network system, wherein such information computer storer means comprises queryable storer means for storing such network and computer information in at least one queryable configuration. Additionally, it provides such a computer network system, wherein such client computer network-node means further comprises initiator means for initiating, by user-action, collection of network and computer information temporally adjacent such time (t).

Also, it provides such a computer network system wherein such initiator means comprises at least one user-selectable display icon structured and arranged to be selected by at least one user at such time (t). In addition, it provides such a computer network system wherein such client-computer operations-state information collector computer processor means comprises at least one configuration, configurable by at least one network administrator, to collect such client-computer operations-state information specified by such configuration.

In accordance with another preferred embodiment hereof, this invention provides a method, for collecting (at a client computer network node) network and computer information (temporally adjacent to at least one user-perceived computer performance anomaly) from one or more network connectivity resource nodes at a time determined by user action, comprising the steps of: marking, by at least one time marker computer processor, at least one time (t) of user action indicating at least one user-perceived computer performance anomaly; collecting, by at least one client-computer operations-state information collector computer processor, client-computer operations-state information temporally adjacent such time (t); mapping, by at least one network connectivity path map computer processor, such one or more network connectivity resource nodes along network connectivity paths actively in use by such at least one client computer network-node and temporally adjacent such time (t); requesting, by at least one network connectivity node-state information requestor computer processor, network connectivity node-state information from such one or more network connectivity resource nodes along such network connectivity paths actively in use by such at least one client computer network-node and temporally adjacent time (t); gathering, by at least one information gather computer processor, such client-computer operations-state information, such network connectivity paths, and such network connectivity node-state information; storing, in at least one information computer storer, such gathered such client-computer operations-state information, such network connectivity paths, and such network connectivity node-state information; wherein such network and computer information comprises such client-computer operations-state information, such network connectivity paths, and such network connectivity node-state information; and wherein network and computer information temporally adjacent to the user-perceived computing performance anomaly indicated at such time (t) is collected.

And, it provides such a method, wherein such at least one information computer storer stores such network and computer information is into at least one queryable configuration. Further, it provides such a method, further comprising the step of accepting, by at least one user command acceptor computer processor installed on such at least one client computer network-node, at least one command provided by such user indicating perception of such at least one computer performance anomaly. Even further, it provides such a method, further comprising the step of executing, by at least one executor computer processor, collection of such network and computer information temporally adjacent such time (t).

Moreover, it provides such a method, wherein the step of executing requires no further interaction with such user to collect such network and computer information. Additionally, it provides such a method further comprising the step of storing, by at least one information storing computer processor, such collected network and computer information locally on such at least one client computer network-node. Also, it provides such a method wherein such at least one information storing computer processor stores such collected network and computer information locally of such at least one client computer network-node in at least one event log database.

In addition, it provides such a method, wherein such marking step further comprises marking, by such at least one time marker computer processor, such client-computer operations-state information with the actual time of collection. And, it provides such a method, wherein such marking step further comprises marking, by such at least one time marker computer processor, such network connectivity paths, and such network connectivity node-state information with the actual time of collection.

In accordance with another preferred embodiment hereof, this invention provides a computer network system, for collecting (at a client-node) network and computer information (temporally adjacent to at least one user-perceived computing performance anomaly) from connectivity resource nodes at a time determined by user action, comprising: at least one client computer network-node structured and arranged to network with one or more network connectivity resource nodes; wherein such at least one client computer network-node comprises at least one information collector computer processor structured and arranged to collect network and computer information temporally adjacent to at least one user-perceived computing performance anomaly, comprising at least one time marker computer processor structured and arranged to mark a time (t) of user action indicating such at least one user-perceived computer performance anomaly, at least one client-computer operations-state information collector computer processor structured and arranged to collect client-computer operations-state information temporally adjacent such time (t), at least one network connectivity path map computer processor structured and arranged to map such one or more network connectivity resource nodes along network connectivity paths actively in use by such at least one client computer network-node and temporally adjacent such time (t), at least one network connectivity node-state information requestor computer processor structured and arranged to request network connectivity node-state information, from such one or more network connectivity resource nodes along such network connectivity paths, temporally adjacent such time (t), at least one information gatherer computer processor structured and arranged to gather such client-computer operations-state information, such network connectivity paths, and such network connectivity node-state information, and at least one information computer storer structured and arranged to store such gathered such client-computer operations-state information, such network connectivity paths, and such network connectivity node-state information; wherein such network and computer information comprises such client-computer operations-state information, such network connectivity paths, and such network connectivity node-state information; and wherein such at least one client computer network-node collects network and computer information temporally adjacent to such at least one user-perceived computing performance anomaly indicated at such time (t).

Further, it provides such a computer network system, wherein such information computer storer comprises at least one queryable storer structured and arranged to store such network and computer information in at least one queryable configuration. Even further, it provides such a computer network system further comprising at least one user interface initiator structured and arranged to initiate, by user action, collection of network and computer information temporally adjacent such time (t).

Even further, it provides such a computer network system wherein such at least one user interface comprises at least one user-selectable display icon structured and arranged to be selected by such at least one user at such time (t) to activate collection of network and computer information temporally adjacent to such at least one user-perceived computing performance anomaly. Even further, it provides such a computer network system wherein such at least one information collector computer processor comprises at least one configuration, configurable by at least one network administrator, to collect such client-computer operations-state information specified by such configuration.

Even further, it provides such a computer network system wherein such at least one information computer storer stores such collected network and computer information locally on such at least one client computer network-node. Even further, it provides such a computer network system wherein such at least one information computer storer stores such collected network and computer information locally on such at least one client computer network-node in at least one event log database.

According to preferred embodiments of the present invention, this invention provides Each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
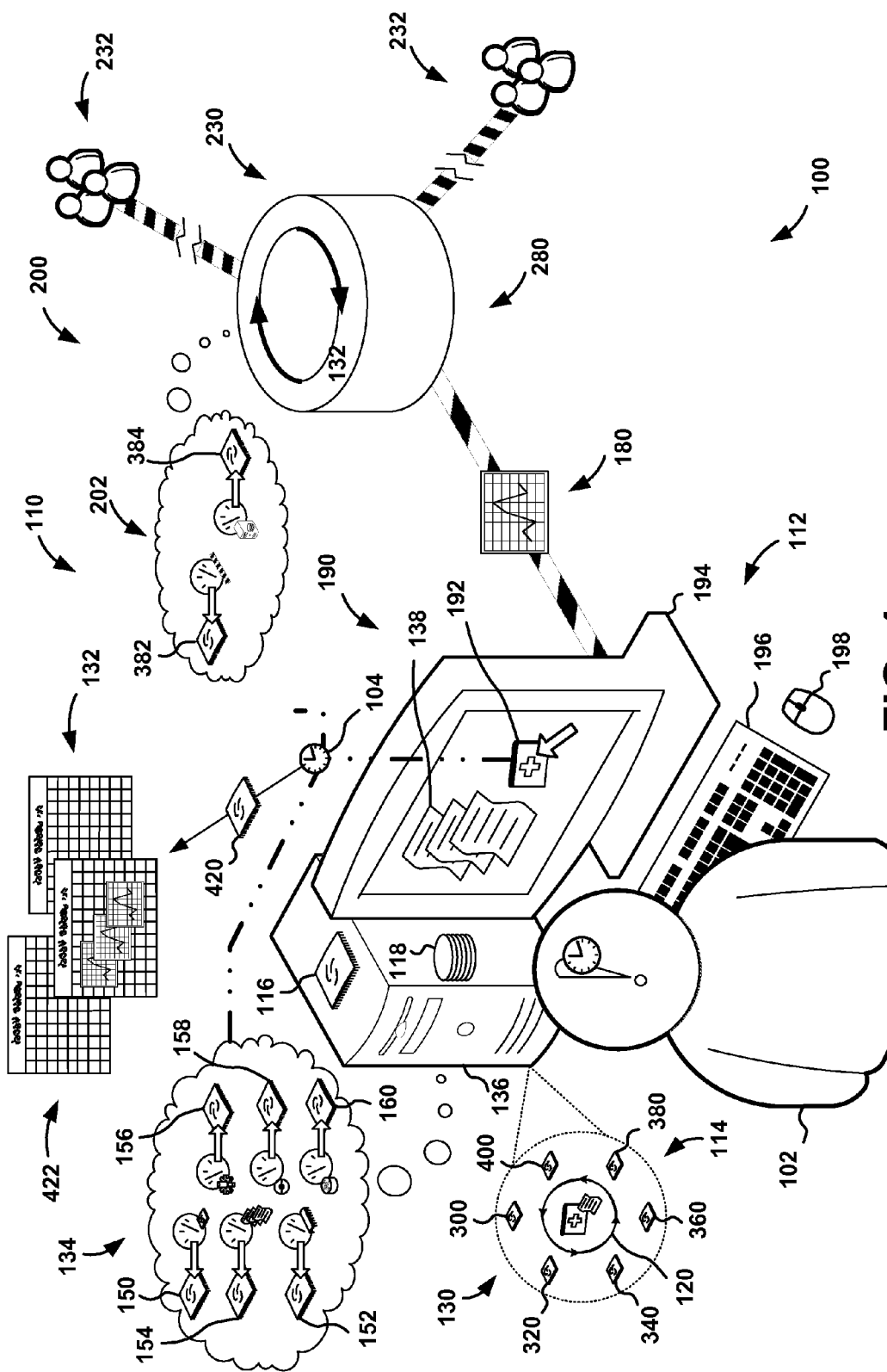
FIG. 1 shows a diagrammatic view, illustrating an improved IT system, according to a preferred embodiment of the present invention.

FIG. 1 shows a diagrammatic view, illustrating improved IT system 100, according to a preferred embodiment of the present invention. Improved IT system 100 preferably operates in at least one client-server IT computing environment 110, as shown, as a tool to preferably enable user-perceived computing performance monitoring and optimization. Improved IT system 100 preferably captures information relating to the real-time quality of IT services experienced by at least one local user 102. Local user 102 preferably communicates with at least one computer network 200 through at least one local client computer system 112, as shown. Improved IT system 100 preferably comprises at least one information collector 130, as shown. Information collector 130 preferably captures computing performance data that is preferably temporally and contextually relevant to the quality of network service experienced by local user 102.

Information collector 130 preferably collects information 132 relating to a time-frame of user-perceived computing performance while preferably communicating in computer network 200, as shown. Information collector 130 preferably collects information 132 through iterative sampling, to preferably collect rate based statistics. Information collector 130 preferably operates, preferably upon initiation by a local user 102, preferably through local client computer system 112 (at least embodying herein client computer network-node means for networking with a plurality of network connectivity resource nodes; and at least one client computer network-node structured and arranged to network with one or more network connectivity resource nodes) preferably communicating with computer network 200, as shown. Information collector 130 preferably operates to collect information relating to a time-frame of user-perceived computing performance anomalies. Information collector 130 preferably is configurable, preferably by at least one network administrator 204 (see FIG. 2), to preferably permit configuration of information 132 to be collected (this arrangement at least embodying herein wherein such client-computer operations-state information collector computer processor means comprises at least one configuration, configurable by at least one network administrator, to collect such client-computer operations-state information specified by such configuration; and this arrangement at least herein embodying wherein such at least one information collector computer processor comprises at least one configuration, configurable by at least one network administrator, to collect such client-computer operations-state information specified by such configuration). Information collector 130 preferably is configurable, preferably by at least one network administrator 204 (see FIG. 2), to preferably permit configuration of information collection protocols, preferably iterative sampling rates. Upon reading the teachings of this specification, those skilled in the art will now appreciate that, under appropriate circumstances, considering such issues as cost, future technologies, available resources, IT system requirements, user needs, etc., other management configurations, such as, for example, permitting users to configure information collection, network profile based configuration, pre-configured packages, etc., may suffice.

Information collector 130, preferably upon command provided by local user 102, preferably initiates a series of preferably automated computer functions to preferably execute collection and storage of information 132 from local client computer system 112 and computer network 200. Local user 102 preferably provides a command to initiate information collector 130 preferably when perceiving performance anomalies relating to operations on local client computer system 112 and computer network 200, as shown. Information collector 130 preferably collects information 132 upon command by local user 102 corresponding to time 104.

Time 104 preferably comprises the time local user 102 provides a command to initiate information collector 130. Time 104 preferably corresponds to the timeframe that local user 102 preferably perceives, preferably subjectively perceives, computing performance anomalies and preferably initiates information collector 130. Such computing performance anomalies are preferably at least defined as user-perceived abnormalities in the quality of computing performance while interfacing with computer network 200, preferably user-perceived computing performance degradation or "computing lag", alternately preferably user-perceived computing performance improvement. The inventor theorizes that the more temporally adjacent that information 132 collection occurs to a user-perceived computing performance anomaly, the more relevant information 132 becomes to optimizing computing performance and improving the quality of service experienced by local user 102.

Information collector 130 preferably comprises at least one plurality of processors 114 which preferably perform at least one plurality of processing functions executed by at least one central processing unit (CPU) 116 of local client computer system 112, as shown. Information collector 130 (at least herein embodying wherein such client computer network-node means comprises information collector computer processor means for collecting network and computer information temporally adjacent to at least one user-perceived computing performance anomaly; and at least herein embodying wherein such at least one client computer network-node comprises at least one information collector computer processor structured and arranged to collect network and computer information temporally adjacent to at least one user-perceived computing performance anomaly) is preferably installed, preferably installed as a non-transitory computer system, preferably on local client computer system 112. Information collector 130 preferably collects information 132 from local client computer system 112 and computer network 200 that preferably corresponds with time 104 temporally adjacent to the perception of computing performance anomalies and initiation of information collector 130 by local user 102. Information 132 preferably comprises client information 134 preferably collected from local client computer system 112. Additionally, information 132 preferably comprises network information 202 preferably collected from computer network 200. Information 132 preferably comprises computing performance metrics corresponding to time 104, preferably snapshot measurements of computing performance metrics, preferably microsecond snapshots, preferably millisecond snapshots, of computing performance metrics. Such metrics preferably comprise measurements of data and operational values from local client computer system 112 and computer network 200 corresponding to time 104, preferably temporally adjacent time 104. Such metrics preferably comprise Simple Network Management Protocol (SNMP) variables, Windows Management Instrumentation (WMI) variables, and Management Information Base (MIB) variables. Information collector 130 preferably is configurable, preferably by network administrator 204 (see FIG. 2), to preferably permit administrative configuration of the client information 134 to be collected that preferably is relevant to client-server IT computing environment 110. This arrangement at least herein embodies wherein such network and computer information comprises such client-computer operations-state information, such network connectivity paths, and such network connectivity node-state information.

Information collector 130 preferably stores collected information 132, preferably after collection, in at least one database 118, as shown, preferably in at least one event log database. Database 118 preferably is stored in at least one local non-volatile memory of local client computer system 112 operated by local user 102, as shown. This arrangement at least herein embodies wherein such at least one information computer storer stores such collected network and computer information locally on such at least one client computer network-node; and this arrangement at least embodies herein such at least one information computer storer stores such collected network and computer information locally on such at least one client computer network-node in at least one event log database. Information 132 preferably assists with optimization of local client computer system 112 and computer network 200. More specifically, Information 132 preferably assists with optimization of network devices 230, preferably including server 240, in communication with computer network 200. Upon reading this specification, those with ordinary skill in the art will now appreciate that, under appropriate circumstances, considering such issues as design preference, user preference, future technologies, etc., other storage arrangements such as, for example, external memory storage, network memory storage, portable media storage, etc., may suffice.

Information collector 130 preferably utilizes minimal computing resources from local client computer system 112, and preferably functioning without substantially interrupting resources allocated to other active system processes. Information collector 130 preferably comprises at least one application user-interface 190 (at least herein embodying wherein such client computer network-node means further comprises initiator means for initiating, by user-action, collection of network and computer information temporally adjacent such time (t); and at least embodying herein at least one user interface initiator structured and arranged to initiate, by user action, collection of network and computer information temporally adjacent such time (t)), preferably comprising at least one application execution icon 192. Application execution icon 192 (at least herein embodying wherein such initiator means comprises at least one user-selectable display icon structured and arranged to be selected by at least one user at such time (t); and at least herein embodying wherein such at least one user interface comprises at least one user-selectable display icon structured and arranged to be selected by such at least one user at such time (t) to activate collection of network and computer information temporally adjacent to such at least one user-perceived computing performance anomaly) preferably provides at least one command trigger for local user 102 to activate information collector 130 and initiate collection of information 132 corresponding to an instance of user-perceived anomalous computing performance. Upon reading the teachings of this specification, those skilled in the art will now appreciate that, under appropriate circumstances, considering such issues as future technologies, cost, user preference, etc., other application user-interfaces, such as, for example, simulated user-interaction interfaces, hot-key user interfaces, application add-ins, etc., may suffice.

Upon perceiving an instance of computing performance anomalies, local user 102 preferably selects application execution icon 192 preferably activating information collector 130. Application execution icon 192 preferably comprises a desktop icon that local user 102 preferably selects, preferably clicks, preferably double-clicks. Selection of application execution icon 192 preferably triggers a series of automated computing functions that preferably executes information collector 130. Once activated, information collector 130 preferably requires no further user interaction from local user 102 to effectuate collection of information 132 corresponding to the instance of perceived anomalous computing performance. Additionally, once activated, information collector 130 preferably performs such automated computing functions independent of user interaction. After activation, information collector 130 preferably provides no requests for additional user interaction, and any such additional user interaction preferably has no effect on collection of information 132. Where local user 102 perceives computing performance anomalies in more than one instance, or for example in separate instances, information collector 130 preferably performs, upon user-provided command activation, the function of collecting information 132 corresponding to each instance. In order to preferably minimize network traffic, and preferably maximize relevancy of collected information 132, information collector 130 preferably activates upon user-action only one time within a configurable time-interval.

Local user 102 preferably accesses application user-interface 190, preferably using at least one computer display 194, as shown. Local user 102 preferably accesses application user-interface 190 preferably using at least one computer input device, as shown, preferably keyboard 196, alternately preferably mouse 198. Upon reading the teachings of this specification, those skilled in the art will now appreciate that, under appropriate circumstances, considering such issues as future technologies, cost, user preference, available resources, etc., other user interfaces, such as, for example, touch-screen interfaces, stylus interfaces, joystick interfaces, voice sensing interfaces, biometric recognition interfaces, etc., may suffice.

Local client computer system 112 preferably comprises at least one network connection controller, preferably a Local Area Network (LAN) ethernet controller, preferably an ethernet controller, alternately preferably a non-cellular wireless controller, alternately preferably a Gigabit Passive Optical Network (GPON) controller. Upon reading the teachings of this specification, those skilled in the art will now appreciate that, under appropriate circumstances, considering such issues as cost, future technologies, available resources, etc., other network interface devices, such as, for example, non-cellular Bluetooth® controllers, network modem controllers, dial-up modem controllers, infra-red connection controllers, optical connection controller, firewire controllers, etc., may suffice.

Local user 102 preferably comprises at least one network user 232, preferably when network user 232 is in communication with computer network 200. Computer network 200 preferably hosts data interchange between network devices 230 and network user 232. Computer network 200 preferably hosts data interchange of various data types, preferably interchange of multiple data types, preferably comprising multiple data formats. Multiple data formats preferably comprise audio data formats, alternately preferably video data formats, alternately preferably application data formats. Computer network 200 preferably permits data interchange, preferably high-speed data interchange, between local client computer system 112 and network devices 230 communicatively coupled to computer network 200.

Information collector 130 preferably comprises processors 114 which perform processing functions executed by CPU 116 of local client computer system 112, as shown. Processors 114 preferably comprise at least one information collector activation computer processor 300, at least one time-marker computer processor 320, at least one local client computer operations-state information collector computer processor 340, at least one network connectivity path map computer processor 360, at least one network connectivity node-state information requestor computer processor 380, at least one information gatherer computer processor 400, and at least one information storer computer processor 420. Communication between processors 114 is preferably provided by at least one communications router 120.

Information collector activation computer processor 300 preferably activates information collector 130 preferably to initiate collection of information 132 when local user 102 selects application execution icon 192. Local user 102 preferably selects application execution icon 192, at time 104, when perceiving computing performance anomalies. Information collector activation computer processor 300 preferably activates collection of client information 134 and network information 202. Such activation of information collector 130 preferably occurs temporally adjacent to perception of computing performance anomalies by local user 102.

Time-marker computer processor 320 preferably logs time 104 that user selects application icon 192 and marking information 132 with time 104. Time 104 preferably corresponds to local user 102 selecting application icon 192. Time 104 preferably is the time most temporally adjacent to perception by local user 102 of computing performance anomalies. Time-marker computer processor 320 additionally preferably logs the actual time that information collector 130 collects client information 134 and preferably logs the actual time that information collector 130 collects network information 202. Time-marker computer processor 320 additionally preferably logs the actual time that network devices 230 respond to a request or query for network information 202 made by information collector 130. Time-marker computer processor 320 (at least embodying herein time marker computer processor means for marking a time (t) of user action indicating a user-perceived computer performance anomaly; and at least embodying herein at least one time marker computer processor structured and arranged to mark a time (t) of user action indicating such at least one user-perceived computer performance anomaly) preferably marks information 132, preferably with microsecond accuracy, preferably to denote relevance of computing performance information, preferably comprising bursty and variable computing performance metrics, to computing performance anomalies. Information collector 130 preferably collects client information 134 and, preferably next, preferably collects network information 202 based upon client information 134 collected. Collection of client information 134 and collection of network information 202 preferably occurs at a time temporally adjacent to the perception of computing performance anomalies by local user 102, preferably within microseconds of user-activation of information collector 130. Collection of client information 134 and collection of network information 202 preferably occurs substantially simultaneously, preferably separated by a timeframe on the order of microseconds, preferably milliseconds.

Local client computer operations-state information collector computer processor 340 preferably identifies operational-state information relative to local client computer system 112. Local client computer operations-state information collector computer processor 340 preferably queries local client computer system 112 for operational-state information, preferably such identified operational-state information. Local client computer operations-state information collector computer processor 340 preferably collects such queried operational-state information, relative to local client computer system 112. Local client computer operations-state information collector computer processor 340 preferably queries local client computer system 112 for resource information, preferably comprehensive resource information. Local client computer operations-state information collector computer processor 340 preferably collects resource information from local client computer system 112. Local client computer operations-state information collector computer processor 340 (at least embodying herein client-computer operations-state information collector computer processor means for collecting client-computer operations-state information temporally adjacent such time (t); and at least embodying herein at least one client-computer operations-state information collector computer processor structured and arranged to collect client-computer operations-state information temporally adjacent such time (t)) at least preferably comprises at least one central processor unit (CPU) information collector computer processor 150, preferably at least one memory information collector computer processor 152, preferably at least one application information collector computer processor 154, preferably at least one system information collector computer processor 156, preferably at least one computer hard disk resource information collector computer processor 158, and preferably at least one communications information collector computer processor 160 to perform collection of client information 134. Communication between processors 114 is preferably provided by at least one communications router 120.

CPU information collector computer processor 150, memory information collector computer processor 152, application information collector computer processor 154, system information collector computer processor 156, computer hard disk resource information collector computer processor 158, and communications information collector computer processor 160 each preferably operate simultaneously, and preferably independently, to perform the respective functions of each respective processor.

CPU information collector computer processor 150 preferably collects client information 134 relative to the operational state of the CPU 116 of local client computer system 112. CPU information collector computer processor 150 preferably queries utilization levels of CPU 116 relative to time 104. CPU information collector computer processor 150 preferably collects utilization levels of CPU 116 relative to time 104.

Memory information collector computer processor 152 preferably collects client information 134 relative to the operational state and allocation of computer memory resources operation in local client computer system 112. Memory information collector computer processor 152 preferably queries memory resource levels, preferably volatile memory resource levels, preferably RAM resource levels, of local client computer system 112 relative to time 104. Memory information collector computer processor 152 preferably collects such memory resource levels of local client computer system 112 relative to time 104.

Application information collector computer processor 154 preferably collects client information 134 relative to the operational state of the computer applications 138 operating in local client computer system 112, preferably computer applications 138 communicating with computer network 200, preferably computer applications with active communication connections to computer network 200. Application information collector computer processor 154 preferably queries data interchange levels of computer applications 138 communicating with computer network 200. Application information collector computer processor 154 preferably collects data interchange levels of computer applications 138 communicating with computer network 200.

System information collector computer processor 156 preferably collects client information 134 relative to the operational state of system devices and system processes operating in local client computer system 112, preferably computer devices and system processes facilitating communication with computer network. System information collector computer processor 156 preferably queries local client computer system 112 for data interchange levels of devices and processes communicating with computer network 200. System information collector computer processor 156 preferably collects data interchange levels of devices and processes communicating with computer network 200.

Computer data storage resource information collector computer processor 158 preferably collects client information 134 relative to the operational state of the data storage resources, preferably non-volatile data storage resources, preferably hard-disk data storage resources, operating in local client computer system 112.

Communications information collector computer processor 160 preferably collects client information 134 relative to the operational state of communication devices operating in local client computer system 112, preferably communication devices communicating with computer network 200. Communications information collector computer processor 160 preferably queries local client computer system 112 for network connection protocol information, preferably Transmission Control Protocol (TCP) information, preferably relating to established communication connections to computer network 200, preferably active communication connections to computer network 200. Communications information collector computer processor 160 preferably collects network connection protocol information resulting from such query of local client computer system 112. Upon reading the teachings of this specification, those skilled in the art will now appreciate that, under appropriate circumstances, considering such issues as cost, future technologies, available resources, etc., other communication protocols, such as, for example, internet protocols (IP), file transfer protocols (FTP), user datagram protocols (UDP), datagram congestion control protocols (DCCP), stream control transmission protocols (SCTP), etc., may suffice.

Figure 3:
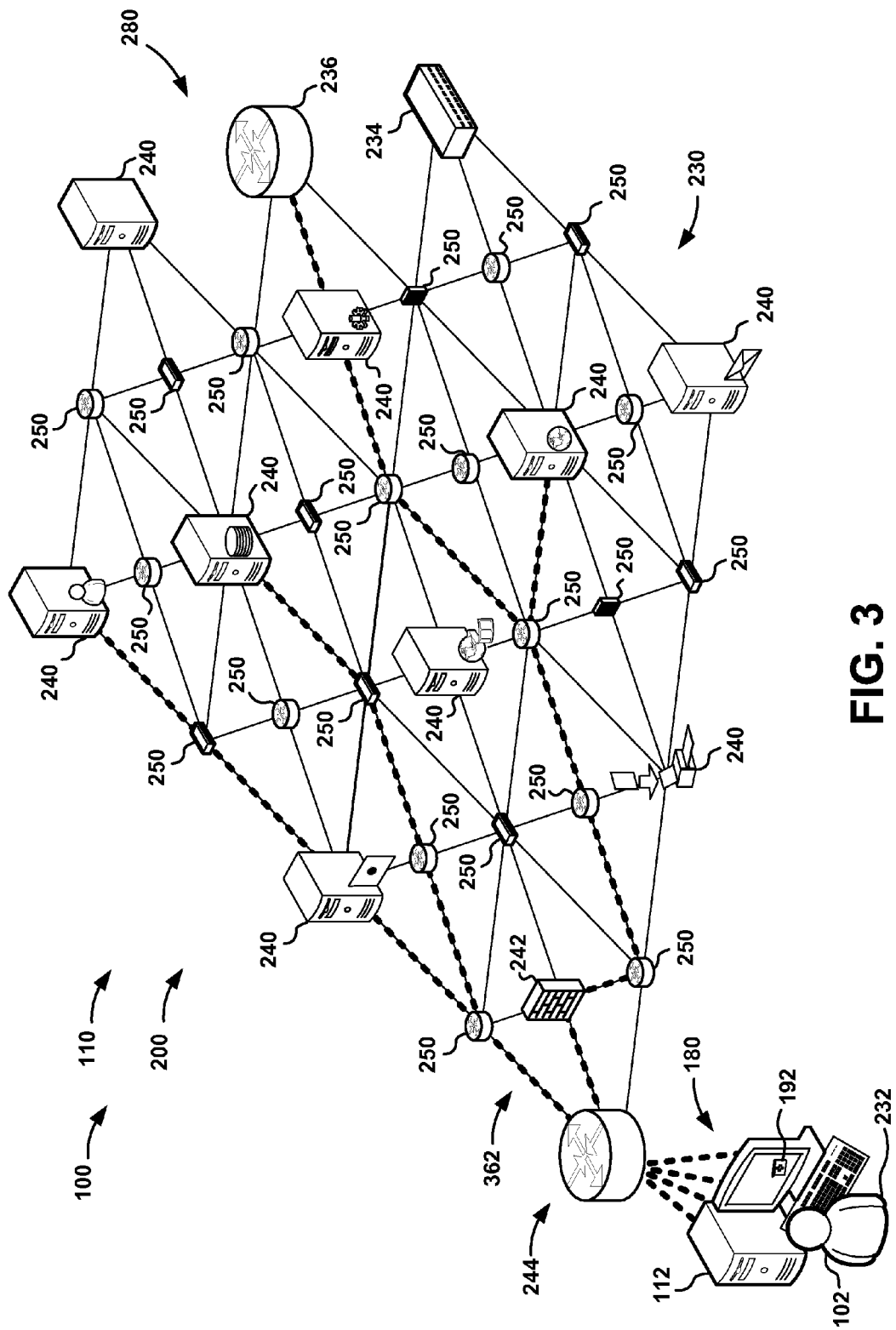
FIG. 3 shows a diagrammatic view, illustrating network connectivity paths of improved IT systems, according to the preferred embodiment of FIG. 1.

Network connectivity path mapping computer processor 360 preferably collects network information 202, preferably of active connections established to computer network 200. Network connectivity path mapping computer processor 360 preferably maps network connectivity paths 362 (see FIG. 3) across computer network 200, preferably corresponding to at least one active communication session 180 established between local client computer system 112 and computer network 200, as shown in FIG. 3, preferably to network devices 230 (described in further detail below). Network connectivity path map computer processor 360 (at least embodying herein network connectivity path map computer processor means for mapping network connectivity resource nodes along network connectivity paths actively in use by such client computer network-node means temporally adjacent such time (t); and at least embodying herein at least one network connectivity path map computer processor structured and arranged to map such one or more network connectivity resource nodes along network connectivity paths actively in use by such at least one client computer network-node and temporally adjacent such time (t)) preferably utilizes client information 134 collected from local client computer system 112 to identify active communications sessions 180 to map network connectivity paths 362 across computer network 200.

Network connectivity node-state information requestor computer processor 380 preferably requests network information 202, preferably relative to operational state information of network communication nodes 250 (see FIG. 3) along network connectivity paths 362 (see FIG. 3) corresponding to active communications sessions 180 established between local client computer system 112 and computer network 200 (see further details below). Network connectivity node-state information requestor computer processor 380 (at least embodying herein network connectivity node-state information requestor computer processor means for requesting network connectivity node-state information, from such network connectivity resource nodes along such network connectivity paths, temporally adjacent such time (t); at least embodying herein and at least one network connectivity node-state information requestor computer processor structured and arranged to request network connectivity node-state information, from such one or more network connectivity resource nodes along such network connectivity paths, temporally adjacent such time (t)) preferably collects network information 202, preferably relative to operational state information of network communication nodes 250 (see FIG. 3) along network connectivity paths 362 (see FIG. 3) corresponding to active communications sessions 180 established between local client computer system 112 and computer network 200 (see further details below).

Network communication nodes 250 preferably comprise intersecting connection paths, alternately preferably branching connection paths, preferably formed by the dynamic communication channels established between multiple network devices 230 and by local client computer system 112 communicating with computer network 200. Network devices 230 preferably provide network communication nodes 250 and preferably facilitate communication across computer network 200.

Network connectivity node-state information requestor computer processor 380 preferably at least comprises at least one active session information collector computer processor 382; alternately preferably comprises at least one network endpoint device information collector computer processor 384. Communication between processors 114 is preferably provided by at least one communications router 120.

Active session information collector computer processor 382 preferably collects network information 202 relative to the operational state of network devices 230 in communication with local client computer system 112 preferably in active communication sessions 180. Active session information collector computer processor 382 preferably collects network device information from each network device 230 in active communication session 180. Such network device information preferably comprises SNMP system information and preferably MIB system information (see further details below). Active session information collector computer processor 382 preferably collects network application information relating to the applications installed on network devices 230, which preferably are actively engaged in active communications session 180. Information collector 130 preferably is configurable, preferably by network administrator 204 (see FIG. 2), preferably to permit configuration of network information 202 to be collected that preferably is relevant to client-server IT computing environment 110. Network endpoint device information collector computer processor 384 preferably collects network information 202 relative to at least one endpoint device 264. Local client computer system 112 preferably communicates, preferably through computer network 200, with endpoint devices 264, during active communication sessions 180. Endpoint device 264 preferably comprises server 240, alternately preferably other local computer systems 113 operated by network users 232. Information collector 130 is preferably installed as part of a non-transitory computer system, preferably on local client computer system 112. Other local computer systems 113 preferably may also have independent installations of information collector 130, and preferably each independently operate as local client computer system 112 with respect to each specific installation of information collector 130.

Active session information collector computer processor 382 and Network endpoint device information collector computer processor 384 each preferably operate simultaneously, and preferably independently, to perform the respective functions of each respective processor. Active session information collector computer processor 382 preferably collects network information 202 simultaneously from each network device 230 in active communications session 180. Network endpoint device information collector computer processor 384 preferably simultaneously collects network information 202 relative to each endpoint device 264 in active communications session 180.

Information gatherer computer processor 400 (at least embodying herein information gatherer computer processor means for gathering such client-computer operations-state information, such network connectivity paths, and such network connectivity node-state information; and at least embodying herein at least one information gatherer computer processor structured and arranged to gather such client-computer operations-state information, such network connectivity paths, and such network connectivity node-state information) preferably gathers client information 134, preferably collected from local client computer system 112, and preferably gathers network information 202, preferably collected from computer network 200.

Information storer computer processor 420 (at least embodying herein information computer storer means for storing such gathered such client-computer operations-state information, such network connectivity paths, and such network connectivity node-state information; and at least embodying herein at least one information computer storer structured and arranged to store such gathered such client-computer operations-state information, such network connectivity paths, and such network connectivity node-state information) preferably stores information 132 gathered by information gatherer computer processor 400. Information storer computer processor 420 preferably stores information 132 preferably in at least one collected-information database 422, preferably in at least one event log. Information storer computer processor 420 preferably permits access to information 132, preferably permits sorting of information 132, and preferably permits querying of information 123, preferably based upon administrative indicators, alternately preferably configuration indicators, alternately preferably performance indicators of local client computer system 112, computer network 200, or network devices 230. This arrangement at least embodies herein wherein such information computer storer means comprises queryable storer means for storing such network and computer information in at least one queryable configuration; and this arrangement at least herein embodies wherein such information computer storer comprises at least one queryable storer structured and arranged to store such network and computer information in at least one queryable configuration.

Figure 2:
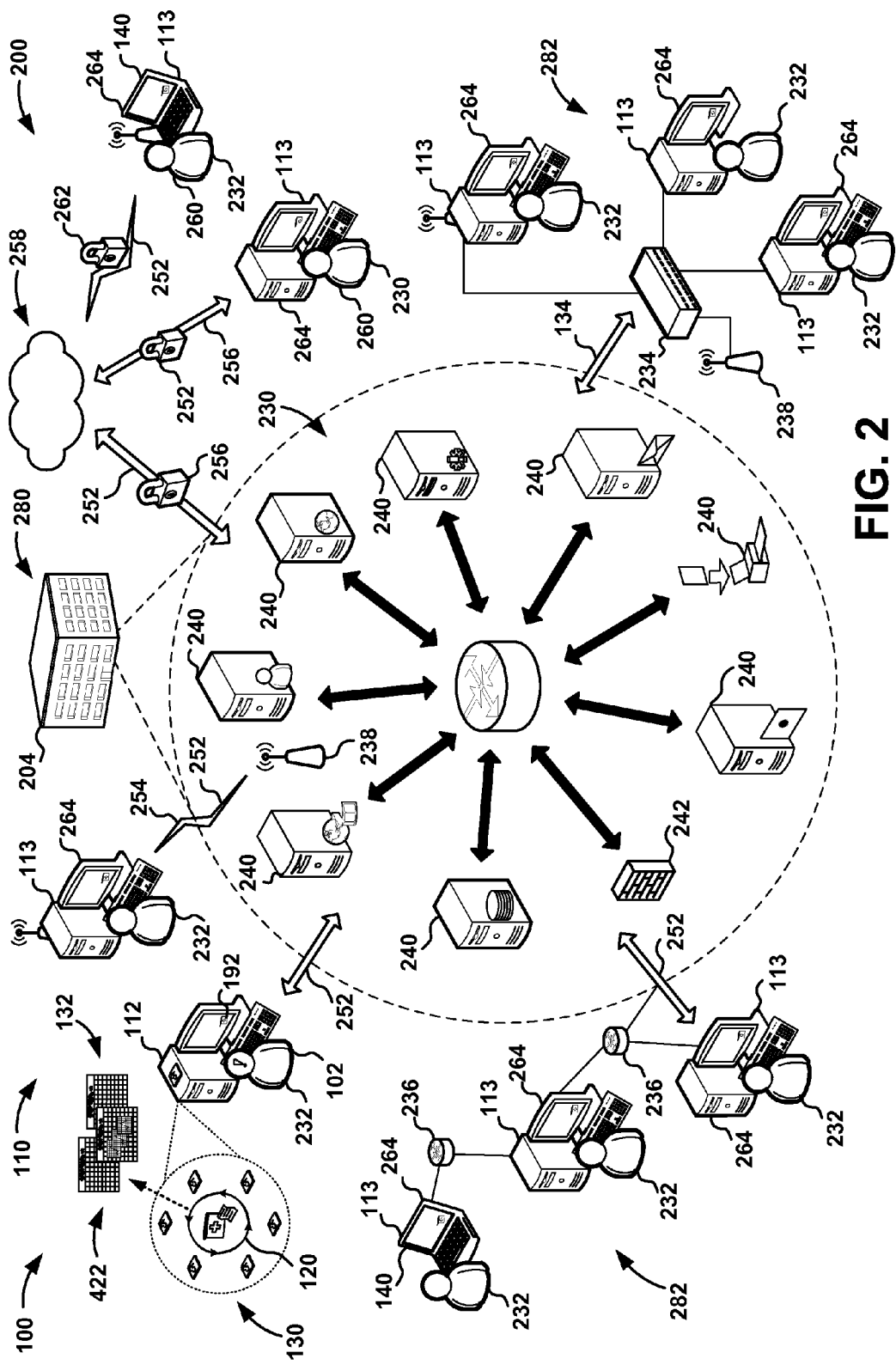
FIG. 2 shows a diagrammatic view, illustrating multiple network users of improved IT system, according to the preferred embodiment of FIG. 1.

FIG. 2 shows a diagrammatic view, illustrating computer network 200 of improved IT systems 100, according to the preferred embodiment of FIG. 1. According to the preferred embodiment of the present invention, information collector 130 preferably communicates with computer network 200, preferably collecting information 132 relating to computing performance of computer network 200 interfacing with local client computer system 112. Information collector 130 preferably captures the real-time quality of network service experienced by local user 102 of computer network 200 through local client computer system 112.

Local client computer system 112 preferably comprises computer 136, alternately preferably laptop computer 140. Upon reading the teachings of this specification, those skilled in the art will now appreciate that, under appropriate circumstances, considering such issues as cost, future technologies, available resources, IT infrastructure, etc., other network connectable computing devices, such as, for example, tablets, notebooks, personal computing devices, etc., may suffice.

Computer network 200 preferably comprises at least one campus area network architecture 280 that preferably facilitates data interchange, preferably through a plurality of network devices 230 and preferably between a plurality of network users 232. Campus area network architecture 280 preferably operates through multiple layers of transport infrastructure and network communication protocols. Campus area network architecture 280 preferably interconnects a plurality of local area networks 282 and preferably communicates through a plurality of connected network devices 230, for example switch 234, router 236, non-cellular wireless routers 238, server 240, firewall 242, proxies, hubs, bridges, and access points. Campus area network architecture 280 preferably accommodates communication, preferably data interchange, with a plurality of network users 232, preferably thousands of network users 232, preferably tens of thousands of network users 232. Computer network 200 preferably permits network users 232 multiple simultaneous data interchange sessions (see FIG. 3 and further details below).

Campus area network architecture 280 preferably operates through multiple layers of transport infrastructure and network communication protocols. Network communication protocols preferably comprise information relative to established Transmission Control Protocol (TCP) connections. Upon reading the teachings of this specification, those skilled in the art will now appreciate that, under appropriate circumstances, considering such issues as cost, future technologies, available resources, etc., other communication protocols, such as, for example, internet protocols (IP) user datagram protocols (UDP), datagram congestion control protocol (DCCP), stream control transmission protocol (SCTP), etc., may suffice.

Local client computer system 112 preferably communicates with computer network 200 through at least one network connection 252. Network connection 252 preferably comprises at least one wired network connection, alternately preferably at least one non-cellular wireless network connection 254. Local user 102 preferably comprises at least one remote network user 260, preferably when network user 232 is in remote communication with computer network 200. Network connection 252 preferably comprises at least one secure network connection 256 to computer network 200, preferably utilizing at least one virtual private network (VPN) tunnel 258 preferably permitting at least one remote network user to preferably remotely and preferably securely communicate with computer network 200. Secure network connection 256 preferably comprises at least one secure non-cellular wireless network connection 262. Upon reading the teachings of this specification, those skilled in the art will now appreciate that, under appropriate circumstances, considering such issues as cost, future technologies, available resources, etc., other communication protocols, such as, for example, File Transfer Protocols (FTP), Hypertext Transfer Protocols (HTTP), Post Office Protocols (POP3), Internet Message Access Protocols (IMAP), etc., may suffice.

Information collector 130 preferably permits implementation across client-server IT computing environment 110 and preferably functions without single points of failure. Information collector 130 is preferably installed on each computer 136 active in computer network 200, which preferably permits each network user 232 to function, independently and locally, in a capacity of local user 102. This preferably permits each network user 232 to independently perceive computing performance anomalies and preferably initiate collection of information 132 based only on local active communications sessions 180 of each network user 232 independent of each other network user 232.

FIG. 3 shows a diagrammatic view, illustrating network connectivity paths 362 of improved IT systems 100, according to the preferred embodiment of FIG. 1. Computer network 200 preferably hosts data interchange between network devices 230 and at least one network user 232 preferably communicating through local client computer system 112. Information collector 130 preferably captures the real-time quality of network service experienced by local user 102 preferably communicating through computer network 200 with local client computer system 112.

Computer network 200 preferably forms a topography of interconnected and interlinked pathways for data interchange between network communication nodes 250, preferably between network devices 230, across computer network 200 to preferably facilitate dynamic network traffic across computer network 200. Network traffic is preferably understood to be the level of data interchange facilitated across computer network 200 at any given time, preferably due to the number of network users 232 on computer network 200, preferably due to the number of network devices communicating in computer network 200. Campus area network architectures 280 preferably have dynamic topologies and preferably host multitudes of network users 232 communicating through multitudes of interconnected LANs 282 and many multitudes of interconnected network devices 230 hosting yet multitudes of applications, with each network user 232, LAN 282, network device 230, and application generating network traffic. To accommodate flow of network traffic, network connectivity paths 362 are preferably dynamic and preferably fluctuate as needed.

Network devices 230 preferably permit management according to SNMP systems that preferably are compatible with (MIB) systems. The SNMP and MIB systems preferably permit management through monitoring and modifying a plurality of system variables relating to the configuration of computer network 200. Information collector 130 preferably queries network devices 230, preferably along active communications session 180 and preferably collects network information 202 from SNMP and MIB systems. Information collector 130 preferably permits configuration of SNMP and MIB system variables, preferably any one of SNMP and MIB system variables, to be monitored and queried for collection of network information 202. The inventor theorizes that SNMP and MIB systems include nearly one million configurable variables relating management aspects of computer network 200.

Computer network 200 preferably operating according to campus area network architecture 280, preferably hosts communications in an environment that preferably utilizes a plurality of disparate devices, preferably manufactured by a plurality of different vendors, and such disparate devices preferably operating with a plurality of disparate technologies, preferably to facilitate data interchange across computer network 200 and with local client computer system 112. In use, computer network 200 preferably utilizes Ethernet technologies, Synchronous Optical Networking (SONET) technologies, wavelength-division multiplexing (WDM) technologies, and GPON technologies. Campus area network architecture 280 preferably utilizes a plurality of servers 240, preferably a plurality of server farms, alternately preferably a plurality of redundant servers, alternately preferably a plurality of backup servers, and preferably provides a plurality of network communication nodes 250 (see FIG. 3), preferably a plurality of area distribution nodes (ADN) that communicate through at least one main communication node (MCN), to facilitate data interchange across computer network 200 and with local computer system 106. Information collector 130 preferably collects information 132, preferably network information 202, preferably SNMP information, preferably MIB information from computer network 200 preferably operating according to campus area network architecture 280. Further, information collector 130 preferably collects WMI data.

Network devices 230 preferably comprise interface network device 244, which is preferably the device closest in physical proximity to local client computer system 112, alternately preferably the device closest in communicative proximity to local client computer system 112, to preferably provide local client computer system 112 access to computer network 200. Interface network device 230 preferably facilitates communication between local client computer system 112 and computer network 200, preferably during active communications sessions 180. Interface network device 230 preferably has access to information 132 relevant to active communication sessions 180 and information 132 relevant to network work connectivity paths 362. The inventor theorizes that that the interface network device 230 has access to information 132 most relevant to active communication sessions 180 and information 132 most relevant to network work connectivity paths 362.

Active communication sessions 180 preferably comprise established communication channels that preferably actively permit data interchange between local client computer system 112 and computer network 200. Local client computer system 112 preferably permits computer applications 138 (see FIG. 1), alternately preferably computer devices, to communicate with computer network 200 during active network sessions 180. During active network sessions 180 local client computer system 112 preferably communicates with computer network 200 along network connectivity paths 362 corresponding to active communication session 180. Network connectivity paths 362 preferably comprise communication channel paths to network devices 230 communicating with local client computer system 112 and such paths preferably correspond to the data interchanged along active communication sessions 180. Network connectivity paths 362 preferably are dynamic to preferably accommodate data interchange as active communication sessions 180 change.

Upon initiation by local user 102, information collector 130 preferably collects information 132. Local client computer operations-state information collector computer processor 340 preferably collects operational-state information relative to local client computer system 112 and preferably relative to active communication sessions 180.

Network connectivity path mapping computer processor 360 preferably identifies and preferably maps network connectivity paths 362 across computer network 200, preferably corresponding to active communication session 180 established between local client computer system 112 and network devices 230. Network connectivity path map computer processor 360 preferably utilizes client information 134 collected from local client computer system 112 to map network connectivity paths 362 across computer network 200. Network connectivity path map computer processor 360 preferably provides active application layer tracking, preferably based upon client information 134, preferably to track data interchange to each network device 230 along active communications session 180, preferably to map network connectivity paths 362 across computer network 200. Network connectivity path map computer processor 360 preferably identifies network devices 230 actively communication with local client computer system 112 based upon collected client information 134.

Network connectivity node-state information requestor computer processor 380 preferably performs the function of requesting network information 202, preferably relative to operational state information of network communication nodes 250 along network connectivity paths 362 corresponding to active communications sessions 180 established between local client computer system 112 and computer network 200. Network connectivity node-state information requestor computer processor 380 preferably requests network information 200 from network devices 230 involved in active communications sessions 180, and preferably requests network information 200 only from network devices 230 involved in active communication sessions 180. Network connectivity node-state information requestor computer processor 380 preferably provides configurable sequential sampling of SNMP and MIB variable values to allow a rate over time calculation. By only requesting network information from network devices 230 involved in active communication sessions 180, a minimization of impact on network traffic is preferably achieved.

Information collector 130 preferably utilizes computer commands to facilitate collection of information 132, preferably the pathping command (pathping), and preferably the netstat command (netstat), preferably pathping and netstat in combination, preferably to facilitate collection of network information 202. Information collector 130 preferably utilizes such computer commands preferably to facilitate determining active network sessions 180, preferably to facilitate mapping of network connectivity paths 362, and preferably to facilitate collection of information relating to network connectivity nodes 250.

Pathping, preferably provides data corresponding each intermediate hop between a source and destination. Pathping preferably allows determination of which network devices 230 along network connectivity paths 362.

Netstat, preferably executed for each network device 230 along network connectivity paths 362 preferably provides information 132, as configured in information collector 130. Netstat and Pathping are commercially available from Microsoft Corporation at http://www.microsoft.com/.

Figure 4:
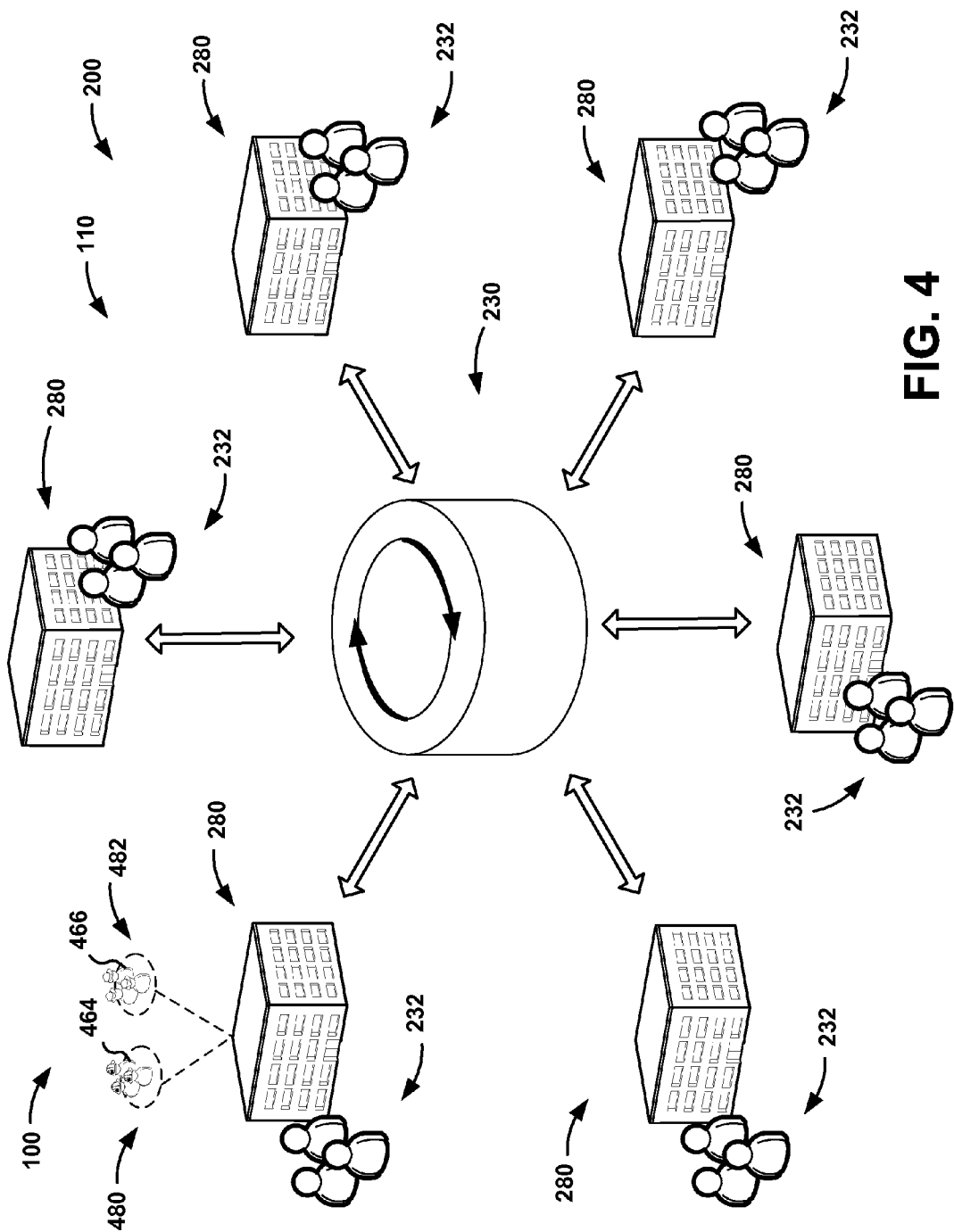
FIG. 4 shows a diagrammatic view, illustrating multiple campus area network architectures associated with improved IT system, according to the preferred embodiment of FIG. 1.

FIG. 4 shows a diagrammatic view, illustrating multiple campus area network architectures 280 associated with improved IT system 100, according to the preferred embodiment of FIG. 1. Computer network 200 preferably hosts data interchange between multiple campus area network architectures 280. Information collector 130 is preferably scalable to accommodate the size and configuration of computer network 200 to preferably facilitate collection of information 132.

Information collector 130 preferably permits implementation across client-server IT computing environment 110 and preferably functions without single points of failure. Information collector 130 is preferably installed on each computer 136 active in computer network 200, which preferably permits each network user 232 to function, independently and locally, in a capacity as local user 102. This preferably permits each network user 232 to independently perceive computing performance anomalies and preferably initiate collection of information 132 based only on local active communications sessions 180 of each network user 232 independent of each other network user 232.

Information collector 130 preferably permits configuration on a network-wide basis to preferably permit collection of information 132 relevant to the client-server IT computing environment 110. Information collector 130 alternately preferably permits configuration on a per network user basis, alternately preferably on at least one group of network users 232, to preferably permit configuration of information 132, according to each network user 232 or group of network users 232, respectively, (independent of the configuration utilized by each other network user 232 or each other group of network users 232, respectively), to be collected. In use, network users 232 operating in computer network 200 preferably operate in various mission specific environments, and information collection 130 is preferably configurable to collect information pertinent to each mission specific environment, preferably independent of each other mission specific environment, preferably while maintaining communication with computer network 200. Information collector 310 preferably permits network users 464, preferably operating in environment 480, preferably to collect information relevant to environment 480, preferably independent of the configuration information collector 130 operated by network users 466 operating in environment 482.

Figure 5:
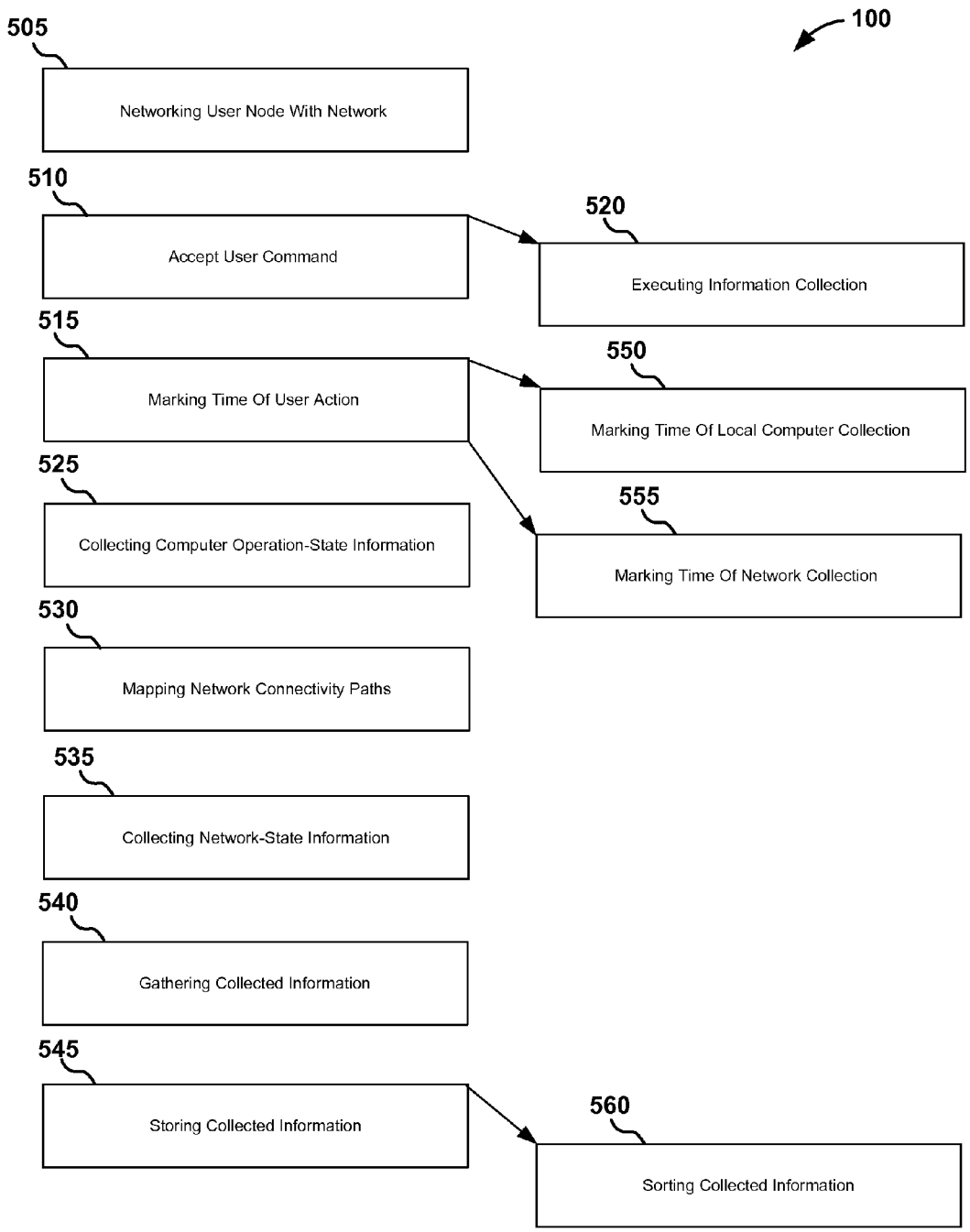
FIG. 5 shows a flow chart view, illustrating computer processes involved in improved IT systems, according to the preferred embodiment of FIG. 1.

FIG. 5 shows a flow chart view, illustrating computer processes involved in improved IT systems 100, according to the preferred embodiment of FIG. 1

According to the step Networking User Node with Network 505, information collector 130 preferably establishes an active communication session 180 with computer network 200.

According to the step Accept User Command 510, information collector 130 preferably accepts an initiation command, preferably provided by local user 102, preferably indicating that local user 102 has perceived computing performance anomalies temporally adjacent to providing command. Local user 102 preferably provides the command to initiate information collector 130 at time 104. This arrangement at least embodies herein accepting, by at least one user command acceptor computer processor installed on such at least one client computer network-node, at least one command provided by such user indicating perception of such at least one computer performance anomaly. After local user 102 provides such initiation command, information collector 132 preferably requires no further user-action. Additionally, once activated, information collector 130 preferably performs such automated computing functions independent of user interaction. After activation, information collector 130 preferably provides no requests for additional user interaction, and any such additional user interaction preferably has no effect on collection of information 132 (relative to each activation instance). This arrangement at least herein embodies wherein the step of executing requires no further interaction with such user to collect such network and computer information.

According to the step Marking Time Of User Action 515, information collector 130 preferably logs time 104 that user selects application icon 192 and marks information 132 with time 104, preferably to correlate time of user-perceived computing performance anomalies with operational metrics collected from local client computer system 112 and computer network 200. According to the step Marking Time of User Action 515, information collector 130 preferably additionally logs the actual time that information collector 130 collects client information 134 and logs the actual time that information collector 130 collects network information 202. Time-marker computer processor 300 preferably marks information 132, preferably with microsecond accuracy. This arrangement at least embodies herein marking, by at least one time marker computer processor, at least one time (t) of user action indicating at least one user-perceived computer performance anomaly; and this arrangement at least herein embodies wherein said marking step further comprises marking, by such at least one time marker computer processor, such network connectivity paths, and such network connectivity node-state information with the actual time of collection.

According to the step Execute Information Collector 520, information collector 130 preferably begins execution of the computer processors associated with information collector 130. Information collector activation computer processer 300 preferably activates information collector 130 (this arrangement at least embodying herein executing, by at least one executor computer processor, collection of such network and computer information temporally adjacent such time (t)).

According to the step Collecting Computer Operation-State Information 525, information collector preferably identifies operational-state information relative to local client computer system 112. Additionally, information collector 130 preferably queries local client computer system 112 for operational-state information, preferably identified operational-state information. Additionally, information collector 130 preferably collects operational-state information, preferably queried operational-state information, relative to local client computer system 112. This arrangement at least embodies herein collecting, by at least one client-computer operations-state information collector computer processor, client-computer operations-state information temporally adjacent such time (t).

According to the step Mapping Network Connectivity Paths 530, information collector 130 preferably maps network connectivity paths 362 across computer network 200, preferably corresponding to active communication session 180 established between local client computer system 112 and computer network 200, preferably network connectivity paths 362 to network devices 230. This arrangement at least embodies herein mapping, by at least one network connectivity path map computer processor, such one or more network connectivity resource nodes along network connectivity paths actively in use by such at least one client computer network-node and temporally adjacent such time (t).

According to the step Collecting Network-State Information 535, information collector 130 preferably requests network information 202, preferably relative to operational state information of network communication nodes 250, along network connectivity paths 362 corresponding to active communications sessions 180 established between local client computer system 112 and computer network 200 (this arrangement at least embodying herein requesting, by at least one network connectivity node-state information requestor computer processor, network connectivity node-state information from such one or more network connectivity resource nodes along such network connectivity paths actively in use by such at least one client computer network-node and temporally adjacent time (t)). Additionally, information collector 130 preferably collects network information 202, preferably relative to operational state information of network communication nodes 250 along network connectivity paths 362 corresponding to active communications sessions 180 established between local client computer system 112 and computer network 200.

According to the step Gathering Collected Information 540, information collector 130 preferably gathers client information 134, preferably collected from local client computer system 112, and preferably gathers from network information 202, preferably collected from computer network (this arrangement at least embodying herein gathering, by at least one information gather computer processor, such client-computer operations-state information, such network connectivity paths, and such network connectivity node-state information).

According to the step Storing Collected Information 545, information collector 130 preferably stores information 132 gathered by information gatherer computer processor 400. Information storer computer processor 420 preferably stores information 132 in at least one collected-information database 422, preferably in at least one event log. Information storer computer processor 420 preferably stores information 132 locally on local client computer system 112. This arrangement at least embodies herein storing, in at least one information computer storer, such gathered such client-computer operations-state information, such network connectivity paths, and such network connectivity node-state information; this arrangement at least embodies herein storing, by at least one information storing computer processor, such collected network and computer information locally on such at least one client computer network-node; and this arrangement at least herein embodies wherein such at least one information storing computer processor stores such collected network and computer information locally of such at least one client computer network-node in at least one event log database.

According to the step Marking Time of Local Computer Collection 550, information collector 130 preferably logs the actual time that information collector 130 collects client information 134 (at least herein embodying wherein said marking step further comprises marking, by such at least one time marker computer processor, such client-computer operations-state information with the actual time of collection).

According to the step Marking Time of Network Collection 555 information collector preferably logs the actual time that information collector 130 collects network information 202 (at least herein embodying wherein said marking step further comprises marking, by such at least one time marker computer processor, such network connectivity paths, and such network connectivity node-state information with the actual time of collection).

According to the step Sorting Collected Information 560, information storer computer processor 420 preferably permits access to information 132, preferably permits sorting of information 132, and preferably permits querying of information 123, preferably based upon administrative indicators, alternately preferably configuration indicators, alternately preferably performance indicators of local client computer system 112, computer network 200, or network devices 230.

Although applicant has described applicant's preferred embodiments of this invention in terms of operating computer methods and structures, it will be understood that applicant's invention transforms a general purpose computer system into a special purpose computer system and that the use of terms, such as, for example, computer interface, computer processor, computer database, etc., inherently refers to components of one or more special purpose computers comprising programmed computer hardware to achieve the operations herein described.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A computer network system, for collecting (at a client-node) network and computer information (temporally adjacent to a user-perceived computing performance anomaly) from connectivity resource nodes at a time determined by user action, comprising:
    a) client computer network-node means for networking with a plurality of network connectivity resource nodes;
    b) wherein said client computer network-node means comprises information collector computer processor means for collecting network and computer information temporally adjacent to at least one user-perceived computing performance anomaly occurring on said client computer network-node means, comprising
        i) anomaly user-indicator means for accepting indication, by a user action, of an advent of the at least one user-perceived computing performance anomaly;
        ii) wherein anomaly user-indicator means accepts the indication temporally adjacent to the advent of the at least one user perceived computing performance anomaly; and
        iii) time marker computer processor means for marking a time (t) of the user action indicating the at least one user-perceived computer performance anomaly,
        iv) client-computer operations-state information collector computer processor means for collecting client-computer operations-state information temporally adjacent such time (t),
        v) network connectivity path map computer processor means for mapping network connectivity resource nodes along network connectivity paths actively in use by said client computer network-node means temporally adjacent such time (t),
        vi) network connectivity node-state information requestor computer processor means for requesting network connectivity node-state information, from such network connectivity resource nodes along such network connectivity paths, temporally adjacent such time (t),
        vii) information gatherer computer processor means for gathering such client-computer operations-state information, such network connectivity paths, and such network connectivity node-state information, and
        viii) information computer storer means for storing such gathered such client-computer operations-state information, such network connectivity paths, and such network connectivity node-state information; and
    c) wherein such network and computer information comprises such client-computer operations-state information, such network connectivity paths, and such network connectivity node-state information; and
    d) wherein said user computer network-node means collects network and computer information temporally adjacent to the at least one user-perceived computing performance anomaly indicated at such time (t).

2. The computer network system according to claim 1, wherein said information computer storer means comprises queryable storer means for storing such network and computer information in at least one queryable configuration.

3. The computer network system according to claim 1, wherein said anomaly user-indicator means further comprises initiator means for initiating, by user-action, collection of network and computer information temporally adjacent such time (t).

4. The computer network system according to claim 3 wherein said initiator means comprises at least one user-selectable display icon structured and arranged to be selected by at least one user at such time (t).

5. The computer network system according to claim 1 wherein said client-computer operations-state information collector computer processor means comprises at least one configuration, configurable by at least one network administrator, to collect such client-computer operations-state information specified by such configuration.

6. A method, for collecting (at a client computer network node) network and computer information (temporally adjacent to at least one user-perceived computer performance anomaly) from one or more network connectivity resource nodes at a time determined by user action, comprising the steps of:
- a) accepting indication, from a user action, of an advent of at least one user-perceived computing performance anomaly;
- b) wherein the step of accepting indication occurs temporally adjacent to the advent of the at least one user perceived computing performance anomaly; and
- c) marking, by at least one time marker computer processor, at least one time (t) of user action indicating the at least one user-perceived computer performance anomaly;
- d) collecting, by at least one client-computer operations-state information collector computer processor, client-computer operations-state information temporally adjacent such time (t);
- e) mapping, by at least one network connectivity path map computer processor, such one or more network connectivity resource nodes along network connectivity paths actively in use by such at least one client computer network-node and temporally adjacent such time (t);
- f) requesting, by at least one network connectivity node-state information requestor computer processor, network connectivity node-state information from such one or more network connectivity resource nodes along such network connectivity paths actively in use by such at least one client computer network-node and temporally adjacent time (t);
- g) gathering, by at least one information gather computer processor, such client-computer operations-state information, such network connectivity paths, and such network connectivity node-state information;
- h) storing, in at least one information computer storer, such gathered such client-computer operations-state information, such network connectivity paths, and such network connectivity node-state information;
- i) wherein such network and computer information comprises such client-computer operations-state information, such network connectivity paths, and such network connectivity node-state information; and
- j) wherein network and computer information temporally adjacent to the user-perceived computing performance anomaly indicated at such time (t) is collected.

7. The method according to claim 6, wherein such at least one information computer storer stores such network and computer information is into at least one queryable configuration.

8. The method according to claim 6, further comprising the step of accepting, by at least one user command acceptor computer processor installed on such at least one client computer network-node, at least one command provided by such user indicating perception of such at least one computer performance anomaly.

9. The method according to claim 8, further comprising the step of executing, by at least one executor computer processor, collection of such network and computer information temporally adjacent such time (t).

10. The method according to claim 9, wherein the step of executing requires no further interaction with such user to collect such network and computer information.

11. The method of claim 6 further comprising the step of storing, by at least one information storing computer processor, such collected network and computer information locally on such at least one client computer network-node.

12. The method of claim 11 wherein such at least one information storing computer processor stores such collected network and computer information locally of such at least one client computer network-node in at least one event log database.

13. The method of claim 6, wherein said marking step further comprises marking, by such at least one time marker computer processor, such client-computer operations-state information with the actual time of collection.

14. The method of claim 6, wherein said marking step further comprises marking, by such at least one time marker computer processor, such network connectivity paths, and such network connectivity node-state information with the actual time of collection.

15. A computer network system, for collecting (at a client-node) network and computer information (temporally adjacent to at least one user-perceived computing performance anomaly) from connectivity resource nodes at a time determined by user action, comprising:
- a) at least one client computer network-node structured and arranged to network with one or more network connectivity resource nodes;
- b) wherein said at least one client computer network-node comprises at least one information collector computer processor structured and arranged to collect network and computer information temporally adjacent to at least one user-perceived computing performance anomaly, occurring on said client computer network-node comprising
  - i) at least one anomaly user-indicator structured and arranged to accept indication, by a user action, of an advent of the at least one user-perceived computing performance anomaly;
  - ii) wherein said at least one anomaly user-indicator accepts the indication temporally adjacent to the advent of the at least one user perceived computing performance anomaly; and
  - iii) at least one time marker computer processor structured and arranged to mark a time (t) of the user action indicating the at least one user-perceived computer performance anomaly,
  - iv) at least one client-computer operations-state information collector computer processor structured and arranged to collect client-computer operations-state information temporally adjacent such time (t),
  - v) at least one network connectivity path map computer processor structured and arranged to map such one or more network connectivity resource nodes along network connectivity paths actively in use by said at least one client computer network-node and temporally adjacent such time (t),
  - vi) at least one network connectivity node-state information requestor computer processor structured and arranged to request network connectivity node-state information, from such one or more network connectivity resource nodes along such network connectivity paths, temporally adjacent such time (t),
  - vii) at least one information gatherer computer processor structured and arranged to gather such client-computer operations-state information, such network connectivity paths, and such network connectivity node-state information, and
  - viii) at least one information computer storer structured and arranged to store such gathered such client-computer operations-state information, such network connectivity paths, and such network connectivity node-state information;
- c) wherein such network and computer information comprises such client-computer operations-state information, such network connectivity paths, and such network connectivity node-state information; and d) wherein said at least one client computer network-node collects network and computer information temporally adjacent to the at least one user-perceived computing performance anomaly indicated at such time (t).

16. The computer network system according to claim 15, wherein said information computer storer comprises at least one queryable storer structured and arranged to store such network and computer information in at least one queryable configuration.

17. The computer network system according to claim 15 wherein said at least one anomaly user-indicator further comprising at least one user interface initiator structured and arranged to initiate, by user action, collection of network and computer information temporally adjacent such time (t).

18. The computer network system according to claim 17 wherein said at least one user interface comprises at least one user-selectable display icon structured and arranged to be selected by such at least one user at such time (t) to activate collection of network and computer information temporally adjacent to such at least one user-perceived computing performance anomaly.

19. The computer network system according to claim 15 wherein said at least one information collector computer processor comprises at least one configuration, configurable by at least one network administrator, to collect such client-computer operations-state information specified by such configuration.

20. The computer network system according to claim 15 wherein said at least one information computer storer stores such collected network and computer information locally on said at least one client computer network-node.

21. The computer network system according to claim 20 wherein said at least one information computer storer stores such collected network and computer information locally on said at least one client computer network-node in at least one event log database.

* * * * *